US012282717B2

United States Patent
Liasi et al.

(10) Patent No.: US 12,282,717 B2
(45) Date of Patent: Apr. 22, 2025

(54) METHOD AND PROCEDURE FOR EVALUATION AND COMPENSATION OF SPRINGBACK

(71) Applicant: Ford Motor Company, Dearborn, MI (US)

(72) Inventors: Evangelos Liasi, Royal Oak, MI (US); Liang Huang, Troy, MI (US); Robert Vaughn Degenhardt, Belleville, MI (US); Christian Richard Genereux, Brighton, MI (US); Ryan Muirhead, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 946 days.

(21) Appl. No.: 17/380,464

(22) Filed: Jul. 20, 2021

(65) Prior Publication Data

US 2023/0028435 A1 Jan. 26, 2023

(51) Int. Cl.
*G06F 30/23* (2020.01)
*G06F 30/15* (2020.01)

(52) U.S. Cl.
CPC ............ *G06F 30/23* (2020.01); *G06F 30/15* (2020.01)

(58) Field of Classification Search
CPC .......... G06F 30/23; G06F 30/15; G06F 30/25; G06F 30/367; G06F 30/398; G06F 2111/00; G06F 2119/22
See application file for complete search history.

(56) References Cited

U.S. PATENT DOCUMENTS

| 8,151,427 | B1 | 4/2012 | Yousef et al. |
| 2014/0019071 | A1* | 1/2014 | Ishiwatari ................ G01L 1/04 702/42 |
| 2015/0134093 | A1* | 5/2015 | Dos Reis Alipio Da Cruz .......... G06F 30/15 700/97 |
| 2015/0294032 | A1* | 10/2015 | Lagally ................... G06F 30/00 703/1 |
| 2016/0196361 | A1* | 7/2016 | Viswanathan ......... B21D 37/20 703/8 |
| 2018/0285488 | A1* | 10/2018 | Zhu ......................... G06F 30/20 |

FOREIGN PATENT DOCUMENTS

| CN | 103808222 | 5/2014 |
| CN | 110756641 | 2/2020 |

OTHER PUBLICATIONS

A. Govik, R. Moshfegh, L. Nilsson, "The effects of forming history on sheet metal assembly" pp. 305-316, (Year: 2014).*

* cited by examiner

*Primary Examiner* — Kibrom K Gebresilassie
(74) *Attorney, Agent, or Firm* — Burris Law, PLLC (57) ABSTRACT

A method for compensating springback of a part includes running a finite element analysis (FEA) simulation of forming a panel using a model of forming die such that a panel with springback is simulated, determining at least two zero springback locations on the panel where hanging apertures are simulated, running an FEA simulation of the panel hanging from the hanging apertures, and comparing a geometry of the hanging panel to a geometry of a reference panel such that a difference between the geometry of the hanging panel and the geometry of the reference panel due to the springback is determined and compensated.

20 Claims, 6 Drawing Sheets

METHOD AND PROCEDURE FOR EVALUATION AND COMPENSATION OF SPRINGBACK

FIELD

The present disclosure relates to springback during forming of sheet metal parts and particularly to springback during forming of a vehicle fender.

BACKGROUND

The statements in this section merely provide background information related to the present disclosure and may not constitute prior art.

The manufacture of sheet metal parts such as vehicle fenders, hoods, trunks, and bumpers, among others, typically includes plastically deformation of a piece of sheet metal (also known as and referred to herein as a "sheet metal blank" or simply a "blank") using one or more sheet metal forming techniques such as drawing, deep drawing, and stretch-drawing. And such sheet metal forming techniques use one or more forming dies to plastically deform a blank into a desired shape. However, springback, i.e., a geometric change to a plastically deformed blank after it has been released from forces exerted by the one or more forming dies, can affect dimensional accuracy of the formed part.

The present disclosure addresses issues related to springback during sheet metal forming and countermeasures or compensation for the springback that occurs during sheet metal forming.

SUMMARY

This section provides a general summary of the disclosure and is not a comprehensive disclosure of its full scope or all of its features.

In one form of the present disclosure, a method for compensating springback of a part includes the steps of:

a) running a finite element analysis (FEA) simulation of forming a panel using a model of an Alpha(i) forming die such that an Alpha(i) panel with springback is simulated, wherein i=1;

b) determining at least two locations on the Alpha(i) panel where springback displacement is about 0.0 mm and simulating an aperture at each of the at least two locations, wherein the simulated apertures in the Alpha(i) panel comprise hanging apertures;

c) running an FEA simulation of the Alpha(i) panel hanging from the hanging apertures in an installed orientation and in a stress-free state except for an effect of gravity;

d) comparing a geometry of the hanging Alpha(i) panel to a geometry of a reference panel and determining a difference between the geometry of the hanging Alpha(i) panel and the geometry of the reference panel due to the springback;

e) incrementing i to equal i+1;

f) generating the Alpha(i) forming die model with at least one morphed surface as a function of the difference between the geometry of the hanging Alpha(i−1) panel and the geometry of the reference panel due to the springback;

g) running an FEA simulation of forming the panel with the hanging apertures using the Alpha(i) forming die model such that the Alpha(i) panel with springback and at least one morphed surface is simulated; and h) repeating steps c) through g) until the difference between the geometry of the hanging Alpha(i) panel and the geometry of the reference panel due to the springback is less than a predefined delta value.

In some variations, the springback displacement of the least two hanging apertures in the Alpha(i) panel comprise about 0.0 mm springback in a length direction and in a width direction of the Alpha(i) panel.

In at least one variation, the Alpha(i) panel includes a Class A surface and a non-Class A surface, and in such variations the at least two hanging apertures extend through the Class A surface of the Alpha(i) panel and step c) includes running the FEA simulation of the Alpha(i) panel hanging from the apertures hanging or hanging pins attached to the non-Class A surface in the installed orientation and in the stress-free stated except for the effect of gravity, wherein the Alpha(i) panel has a morphed non-Class A surface compared to the Alpha(i−1) panel. Also, step d) includes comparing the Class A surface geometry of the hanging Alpha(i) panel to a Class A surface geometry of the reference panel and determining a difference between the Class A surface geometry of the hanging Alpha(i) panel and the Class A surface geometry of the reference panel.

In some variations, step f) includes generating the Alpha(i) forming die model with springback consideration of the Class A surface as a function of the difference between the Class A surface geometry of the hanging Alpha(i) panel geometry and the Class A surface geometry of the reference panel. Also, step h) includes repeating steps c) through g) described above with springback consideration of the Class A surface until the difference between the Class A surface geometry of the hanging Alpha(i) panel and the Class A surface geometry of the reference panel due to the springback is less than the predefined delta value.

In at least one variation, the method further includes the steps of:

j) running an FEA simulation of the Alpha(i) panel hanging from the hanging apertures or hanging pins attached to the non-Class A surface in the installed orientation and in the stress-free stated except for the effect of gravity;

k) comparing the non-Class A surface geometry of the hanging Alpha(i) panel to a non-Class A surface geometry of the reference panel and determining a difference between the non-Class A surface geometry of the hanging Alpha(i) panel and the non-Class A surface geometry of the reference panel;

l) incrementing i to equal i+1;

m) generating the Alpha(i) forming die model with springback consideration of the non-Class A surface as a function of the difference between the non-Class A surface geometry of the hanging Alpha(i) panel and the non-Class A surface geometry of the reference panel;

n) running an FEA simulation of forming an Alpha(i) panel with the hanging apertures or hanging pins attached to the non-Class A surface using the Alpha(i) forming die model and with springback consideration of the non-Class A surface; and o) repeating steps j) through n) until the difference between the non-Class A surface of the hanging Alpha(i) panel geometry and the non-Class A surface geometry of the reference panel due to the springback is less than a predefined epsilon value.

In some variations, the panel is a fender panel of a vehicle, the fender panel comprising a Class A surface, a catwalk surface, a doorline surface, and a wheel opening surface. And in such variations the steps a) through h) described above include:

a) running an FEA simulation of forming the fender panel using the Alpha(i) forming die model where i=1 such that an Alpha(i) fender panel is simulated;

b) determining the at least two locations on the Class A Surface of the Alpha(i) fender panel where the springback displacement is about 0.0 mm and simulating the aperture at each of the at least two locations, wherein the simulated apertures in the Alpha(i) fender panel comprise the hanging apertures;

c) running an FEA simulation of the Alpha(i) fender panel hanging from the hanging apertures in the installed orientation and in the stress-free stated except for the effect of gravity;

d) comparing the Class A surface geometry of the hanging Alpha(i) fender panel to a Class A surface geometry of the reference panel and determining a difference between the Class A surface geometry of the hanging Alpha(i) fender panel and the Class A surface geometry of the reference panel due to the springback;

e) incrementing i to equal i+1;

f) generating the Alpha(i) forming die model with springback consideration of the Class A surface as a function of the difference between the Class A surface geometry of the hanging Alpha(i−1) fender panel and the Class A surface geometry of the reference panel due to the springback;

g) running an FEA simulation of forming the panel with the hanging apertures using the Alpha(i) forming die model and with springback consideration of the Class A surface; and h) repeating steps c) through g) until the difference between the Class A surface geometry of the hanging Alpha(i) fender panel and the Class A surface geometry of the reference panel due to the springback is less than the predefined delta value.

In some variations the method further includes the steps of:

j) running the FEA simulation of the catwalk surface of the Alpha(i) fender panel hanging from the hanging apertures in the installed orientation and in the stress-free stated except for the effect of gravity;

k) comparing a catwalk surface geometry of the hanging Alpha(i) fender panel to a catwalk surface geometry of the reference panel and determining a difference between the catwalk surface geometry of the hanging Alpha(i) fender panel geometry and the catwalk surface geometry of the reference panel;

l) incrementing i to equal i+1;

m) generating the Alpha(i) forming die model with springback consideration of the catwalk surface as a function of the difference between the catwalk surface geometry of the hanging Alpha(i) fender panel and the catwalk surface geometry of the reference panel;

n) running an FEA simulation of forming the panel with the hanging apertures using the Alpha(i) forming die model and with springback consideration of the catwalk surface; and o) repeating steps j) through n) until the difference between the catwalk surface geometry of the hanging Alpha(i) fender panel and the catwalk surface geometry of the reference panel due to the springback is less than a predefined epsilon value.

In at least one variation, the method further includes the steps of:

p) running an FEA simulation of the Alpha(i) fender panel hanging from the catwalk surface in the installed orientation and in the stress-free stated except for the effect of gravity;

q) comparing a doorline surface geometry of the hanging Alpha(i) fender panel to a doorline surface geometry of the reference panel and determining a difference between the doorline surface geometry of the hanging Alpha(i) fender panel geometry and the doorline surface geometry of the reference panel;

r) incrementing i to equal i+1;

s) generating the Alpha(i) forming die model with springback consideration of the doorline surface as a function of the difference between the doorline surface geometry of the hanging Alpha(i) fender panel and the doorline surface geometry of the reference panel;

t) running an FEA simulation of forming the panel with the hanging apertures using the Alpha(i) forming die model and with springback consideration of the doorline surface; and u) repeating steps p) through t) until the difference between the doorline surface geometry of the hanging Alpha(i) fender panel and the doorline surface geometry of the reference panel due to the springback is less than a predefined gamma value.

In some variations, the method further includes the steps of:

v) running an FEA simulation of the Alpha(i) fender panel hanging from the catwalk surface in the installed orientation and in the stress-free stated except for the effect of gravity;

w) comparing the wheel opening surface geometry of the hanging Alpha(i) fender panel to a wheel opening surface geometry of the reference panel and determining a difference between the wheel opening surface geometry of the hanging Alpha(i) fender panel geometry and the wheel opening surface geometry of the reference panel;

x) incrementing i to equal i+1;

y) generating the Alpha(i) forming die model with springback consideration of the wheel opening surface as a function of the difference between the wheel opening surface geometry of the hanging Alpha(i) fender panel and the wheel opening surface geometry of the reference panel;

z) running an FEA simulation of forming the panel using the Alpha(i) forming die model with springback consideration of the wheel opening surface; and aa) repeating steps v) through z) until the difference between the wheel opening surface geometry of the hanging Alpha(i) fender panel and the wheel opening surface geometry of the reference panel due to springback is less than a predefined gamma value.

And in at least one variation, the method includes manufacturing at least one forming die based on the Alpha(i) forming die model.

In another form of the present disclosure, a method for compensating springback of a fender for a vehicle includes the steps of:

a) running a finite element analysis (FEA) simulation of forming a panel using an Alpha(i) forming die model such that an Alpha(i) fender panel with springback is simulated, wherein i=1;

b) determining at least two locations on a Class A surface of the Alpha(i) fender panel where springback displacement is about 0.0 mm and simulating an aperture at each of the at least two locations, wherein the simulated apertures in the Alpha(i) fender panel comprise hanging apertures;

c) running an FEA simulation of the Alpha(i) fender panel hanging from the hanging apertures in an installed orientation and in a stress-free stated except for an effect of gravity;

d) comparing a Class A surface geometry of the hanging Alpha(i) fender panel to a Class A surface geometry of a reference panel and determining a difference between the Class A surface geometry of the hanging Alpha(i) fender panel and the Class A surface geometry of the reference panel due to the springback;

e) incrementing i to equal i+1;

f) generating the Alpha(i) forming die model with springback consideration of the Class A surface as a function of the difference between the Class A surface geometry of the hanging Alpha(i) fender panel to the Class A surface geometry of the reference panel due to the springback;

g) running an FEA simulation of forming the panel with the hanging apertures using the Alpha(i) forming die model and with springback consideration of the Class A surface; and h) repeating steps c) through g) until the difference between the Class A surface geometry of the hanging Alpha(i) panel and the Class A surface geometry of the reference panel due to the springback is less than a predefined delta value.

In some variations, the method further includes the steps of:

j) running an FEA simulation of the Alpha(i) fender panel hanging from the hanging apertures in the installed orientation and in the stress-free stated except for the effect of gravity;

k) comparing a catwalk surface geometry of the hanging Alpha(i) fender panel to a catwalk surface geometry of the reference panel and determining a difference between the catwalk surface geometry of the hanging Alpha(i) fender panel geometry and the catwalk surface geometry of the reference panel;

l) incrementing i to equal i+1;

m) generating the Alpha(i) forming die model with springback consideration of the catwalk surface as a function of the difference between the catwalk surface geometry of the hanging Alpha(i) fender panel and the catwalk surface geometry of the reference panel;

n) running an FEA simulation of forming the fender panel with the hanging apertures using the Alpha(i) forming die model with springback consideration of the catwalk surface; and o) repeating steps j) through n) until the difference between the catwalk surface geometry of the hanging Alpha (i) fender panel and the catwalk surface geometry of the reference panel due to the springback is less than a predefined epsilon value.

In still another form of the present disclosure, a method for compensating springback of a fender for a vehicle includes the steps of:

a) running a finite element analysis (FEA) simulation of forming a panel using an Alpha(i) forming die model such that an Alpha(i) fender panel with springback is simulated, wherein i=1;

b) determining at least two locations on a Class A surface of the Alpha(i) fender panel where springback displacement is about 0.0 mm and simulating an aperture at each of the at least two locations, wherein the simulated apertures in the Alpha(i) fender panel comprise hanging apertures;

c) running an FEA simulation of the Alpha(i) fender panel hanging from the hanging apertures in an installed orientation and in a stress-free stated except for an effect of gravity;

d) comparing a Class A surface geometry of the hanging Alpha(i) fender panel to a Class A surface geometry of a reference panel and determining a difference between the Class A surface geometry of the hanging Alpha(i) fender panel to the Class A surface geometry of the reference panel due to the springback;

e) incrementing i to equal i+1;

f) generating the Alpha(i) forming die model with springback consideration of the Class A surface as a function of the difference between the Class A surface geometry of the hanging Alpha(i) fender panel to the Class A surface geometry of the reference panel due to the springback;

g) running an FEA simulation of forming the panel with the hanging apertures using the Alpha(i) forming die model and with springback consideration of the Class A surface;

h) repeating steps c) through g) until the difference between the Class A surface geometry of the hanging Alpha(i) panel and the Class A surface geometry of the reference panel due to the springback is less than a predefined delta value;

j) running an FEA simulation of the Alpha(i) fender panel hanging from the hanging apertures in the installed orientation and in the stress-free stated except for the effect of gravity;

k) comparing a catwalk surface geometry of the hanging Alpha(i) fender panel to a catwalk surface geometry of the reference panel and determining a difference between the catwalk surface geometry of the hanging Alpha(i) fender panel geometry and the catwalk surface geometry of the reference panel;

l) incrementing i to equal i+1;

m) generating the Alpha(i) forming die model with springback consideration of the catwalk surface as a function of the difference between the catwalk surface geometry of the hanging Alpha(i) fender panel and the catwalk surface geometry of the reference panel;

n) running an FEA simulation of forming the panel with the hanging apertures using the Alpha(i) forming die model and with springback consideration of the catwalk surface;

o) repeating steps j) through n) until the difference between the catwalk surface geometry of the hanging Alpha (i) fender panel and the catwalk surface geometry of the reference panel due to the springback is less than a predefined epsilon value;

p) running an FEA simulation of the Alpha(i) fender panel hanging from the catwalk surface in the installed orientation and in the stress-free stated except for the effect of gravity;

q) comparing a doorline surface geometry of the hanging Alpha(i) fender panel to a doorline surface geometry of the reference panel and determining a difference between the doorline surface geometry of the hanging Alpha(i) fender panel geometry and the doorline surface geometry of the reference panel;

r) incrementing i to equal i+1;

s) generating the another Alpha(i) forming die model with springback consideration of the doorline surface as a function of the difference between the doorline surface geometry of the hanging Alpha(i) fender panel and the doorline surface geometry of the reference panel;

t) running an FEA simulation of forming the panel using the Alpha(i) forming die model such that the Alpha(i) panel and with springback consideration of the doorline surface;

u) repeating steps p) through t) until the difference between the doorline surface geometry of the hanging Alpha(i) fender panel and the doorline surface geometry of the reference panel due to the springback is less than a predefined gamma value;

v) running an FEA simulation of the Alpha(i) fender panel hanging from the catwalk surface in the installed orientation and in the stress-free stated except for the effect of gravity;

w) comparing a wheel opening surface geometry of the hanging Alpha(i) fender panel to a wheel opening surface geometry of the reference panel and determining a difference between the wheel opening surface geometry of the hanging Alpha(i) fender panel geometry and the wheel opening surface geometry of the reference panel;

x) incrementing i to equal i+1;

y) generating the Alpha(i) forming die model with springback consideration of the wheel opening surface as a function of the difference between the wheel opening surface geometry of the hanging Alpha(i) fender panel and the wheel opening surface geometry of the reference panel;

z) running an FEA simulation of forming the panel using the Alpha(i) forming die model and with springback consideration of the doorline surface; and aa) repeating steps v) through z) until the difference between the doorline surface geometry of the hanging Alpha(i) fender panel and the doorline surface geometry of the reference panel due to springback is less than a predefined gamma value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
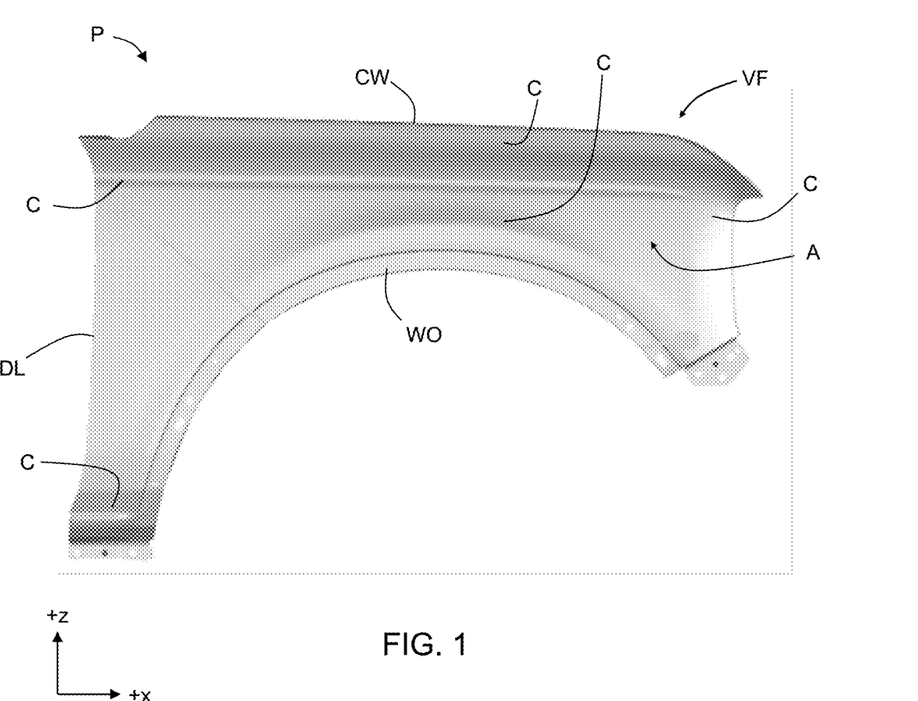
FIG. 1 is an image of a simulated sheet metal part.

Referring to FIG. 1, a computer-aided design (CAD) image of a sheet metal part 'P' having a desired geometry is shown. In some variations, the part P is a vehicle fender panel 'VF' (also referred to herein simply as "vehicle fender VF") with a plurality of contours 'C' that provide a desired shape and "look" of the vehicle fender VF, particularly when the vehicle fender VF is assembled with other components as part of a motor vehicle. In addition, the part P can include one or more surface portions (also referred to herein simply as "surfaces"). For example, the vehicle fender VF can include a Class A surface (labeled 'A' in the figure), a catwalk surface 'CW', a doorline surface 'DL', and a wheel opening surface 'WO', among others.

As used herein, the phrase "Class A surface" refers to a freeform surface of high efficiency and quality such as visible exterior surfaces of vehicle body panels, bumpers, and grills. The phrase "catwalk surface" as used herein refers to a surface of a vehicle fender designed and configured to be complimentary in geometric shape to a portion of a vehicle hood or trunk that is adjacent to the catwalk surface when the hood or trunk is in a closed position. The phrase "doorline surface" as used herein refers to a surface of a vehicle fender designed and configured to be complimentary in geometric shape to a portion of a vehicle door that is adjacent to the doorline surface when the door is in a closed position. And the phrase "wheel opening surface" refers to a surface of a vehicle fender designed and configured to provide an opening or space for a tire of a motor vehicle.

Figure 2:
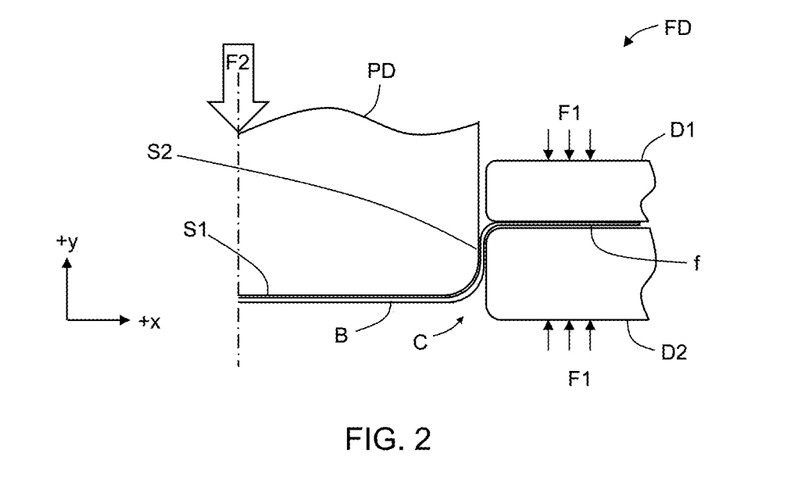
FIG. 2 is a side view of a forming die.

Parts such as the part P are generally formed with one or more forming dies that have die surfaces corresponding to the contours and surfaces of the part P with one example of a portion of a forming die 'FD' forming a sheet metal blank 'B' is shown in FIG. 2. Non-limiting examples of materials from which the sheet metal blank B is made include steels such as low carbon steels and advanced high-strength steels (AHSS), and aluminum sheet alloys, among others.

The forming die 'FD' includes a first die component D1, a second die component D2, and a punch die component 'PD' with die surfaces 'S1' and 'S2'. The first die component D1 is operable to be spaced apart (y direction) from the second die component D2 such that the blank 'B' can be and is positioned between the first and second die component D1, D2 (e.g., on the second die component D2), and extends across a forming cavity 'C'. And when the blank B is in a desired position, the first die component D1 is moves downwardly (−y direction) and into contact with the blank B such that a flange portion of the blank B is positioned and held between the first die component D1 and the second die component D2 with a desired or predefined force 'F1'. Then, the punch die component PD is moved into the forming cavity with a force 'F2' such the blank B is plastically deformed into the forming cavity C and a part with a given shape is provided. For example, a part with a surface corresponding to the die surfaces S1 and S2 can be provided.

It should be understood that while FIG. 2 shows only one forming die FD, a part such as the vehicle fender VF shown in FIG. 1 can be formed using a plurality of forming die stations, e.g., using a plurality of forming steps and different forming dies. In addition, and as noted above, springback of the part P can occur after the forces applied by the first die component D1, second die component D2, and/or punch die D are removed, and thus springback compensation is need in order for the part P to have a final desired geometry.

Springback compensation typically includes an iterative process in the design and manufacture of forming dies. For example, an initial forming die is designed and manufactured for a given part, and then one or more blanks are formed into one or more parts using the initial forming die. The part(s) is/are then analyzed and compared to a desired or reference part and/or to a simulation of a reference part. Such analysis and comparison can include dimensional and shape variations (i.e., geometric variations), surface finish variations, among others. Then, changes are made to the initial forming die, if possible, or a complete new forming die is manufactured based on the comparison noted above, and this "round two" or "morphed" forming die is used to form one or more additional parts (from one or more additional blanks). The one or more additional parts are then analyzed and compared to the reference part and/or the simulation of the reference part and this iterative cycle, i.e., manufacture of a forming die—testing of the forming die—manufacture of a morphed forming die—testing of the forming die, continues until a part(s) with a desired panel shape or geometry is consistently formed. And after a forming die is developed with the desired amount of springback compensation, this final design of the forming die is released for production. It should be understood that this process is a time and cost intensive process.

Figure 3:
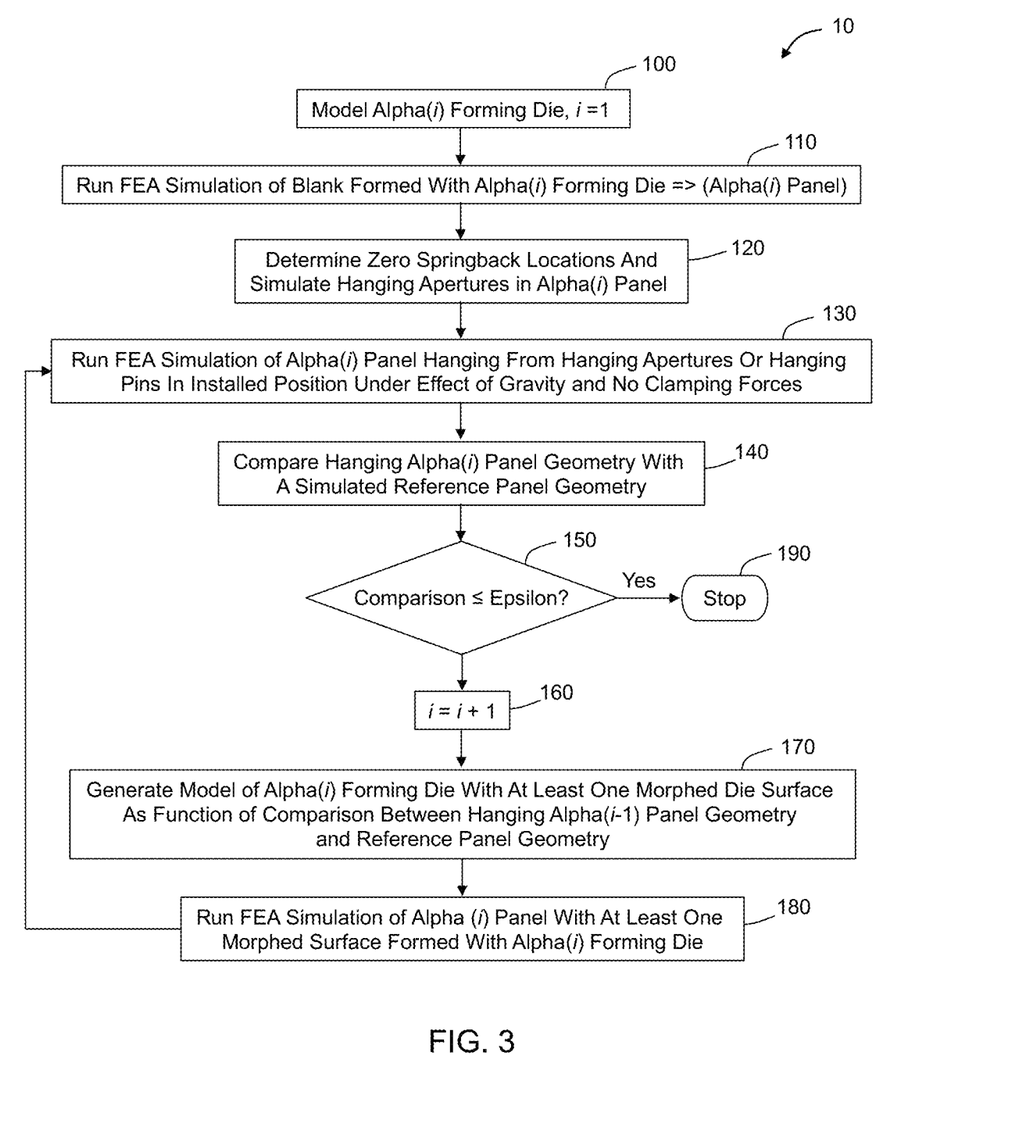
FIG. 3 is a flow chart for a method of evaluating and compensating springback according to one form of the present disclosure.

Referring now to FIG. 3, a method 10 of designing and manufacturing a forming die according to one form of the present disclosure is shown. The method 10 includes starting with a model (e.g., a CAD model) of a forming die (referred to herein as an Alpha(i) forming die with i=1) for forming of a blank into a desired shape at step 100. The model of the Alpha(1) forming die can be a model of a previously used forming die, a model purchased from a forming die designer and/or manufacturer, or a model developed from a reference part to be manufactured and/or a simulation of the reference part, among others.

The method 10 proceeds to step 110 where a finite element analysis (FEA) simulation of forming a blank using the Alpha(i) forming die is executed such that a simulation of plastically deformed panel (referred to herein as a "simulated Alpha(i) panel" or "Alpha(i) panel") is provided. For example, in some variations, step 110 includes using a model of an Alpha(1) forming die to simulate forming of the part 110P shown in FIG. 4A.

Figure 4A:
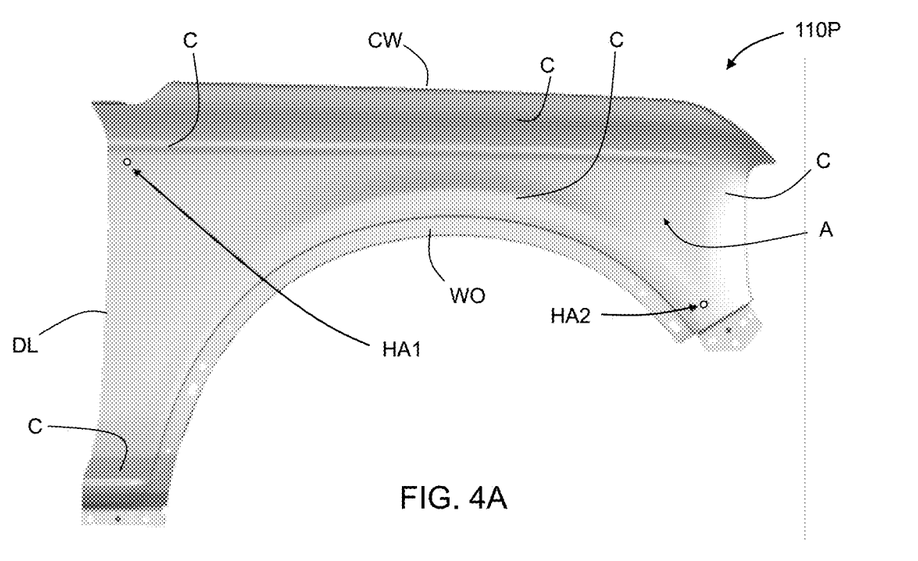
FIG. 4A is an image of a simulated sheet metal part hanging from a pair of hanging apertures according to the teachings of the present disclosure.

At step 120, the Alpha(i) panel is analyzed such that two or more locations on an Class A surface of the Alpha(i) panel with a springback equal to about 0.0 millimeters (mm) are determined (also referred to herein as "zero springback locations"), and hanging apertures 'HA1' and 'HA2' are simulated to be present in or through the Class A surface at the two or more locations as shown in FIG. 4A. Stated differently, at least two locations with generally no springback are determined on the Class A surface of the Alpha(i) panel and these at least two locations are used for apertures from which the Alpha(i) panel is to be hung and evaluated as described in greater detail below. As used herein, the phrase "about 0.0 mm" refers to 0.0 mm+/−0.5 mm (i.e., between −0.5 mm and +0.5 mm), and in at least one variation the phrase "about 0.0 mm" refers to 0.0 mm+/−0.2 mm (i.e., between −0.2 mm and +0.2 mm), or in the alternative, "about 0.0 mm" refers to 0.0 mm+/−0.1 mm (i.e., between −0.1 mm and +0.1 mm). And in some variations, the springback is measured along a length direction (x direction), along a width direction (y direction), and/or along a height direction (z direction) of the Alpha(i) panel. For example, in some variations the springback is initially measured with the Alpha(i) panel in the forming die position and under such variations the springback is measured in the length and width (x-y) directions. And when the springback is measured with the Alpha(i) panel in the installed position, the springback can be measured in the length and height (x-z) directions.

At step 130, the method 10 includes running or executing an FEA simulation of the Alpha(i) panel hanging in an installed orientation and in a stress-free state except for the effect of gravity acting on the Alpha(i) panel (referred to herein as "simulated hanging Alpha(i) panel" or "hanging Alpha(i) panel"). In some variations the hanging Alpha(i) panel is simulated to be hanging from hanging apertures in a Class A surface as described in greater detail below, while in other variations the hanging Alpha(i) panel is simulated to be hanging from a non-Class A surface as described in greater detail below with respect to FIGS. 4B and 5A-5C. As used herein, the phrase "installed orientation" refers to a position or orientation in three dimensional (3D) space that represents the Alpha(i) panel assembled with other components to make an apparatus or machine such as a motor vehicle. In addition, the phrase "stress-free state" refers to stress state of the hanging Alpha(i) panel without any applied simulated clamping and/or external forces except for the effect of gravity (i.e., a gravitational strength of approximately 9.8 m/s$^2$ in the z-direction shown in the figures).

At step 140, the method 10 includes comparing the hanging Alpha(i) panel with a simulated reference panel (also referred to herein simply as "reference panel") that is a model of a desired final part in the installed orientation and the stress-free state.

At step 150, the method 10 includes determining whether or not the comparison in step 140 is less than a predefined tolerance referred to herein as "Epsilon." Stated differently, step 150 determines whether or not the geometry of the hanging Alpha(i) panel is within a predefined tolerance with respect to the reference panel. In some variations the predefined tolerance Epsilon is +/−0.5 mm along a length direction (x direction), a width direction (y direction), and/or a height direction (z direction) of the Alpha(i) panel. In at least one variation the predefined tolerance Epsilon is +/−0.2 mm along a length direction (x direction), a width direction (y direction), and/or a height direction (z direction) of the Alpha(i) panel. And in still other variations the predefined tolerance Epsilon is +/−0.2 mm along a length direction (x direction), a width direction (y direction), and/or a height direction (z direction) of the Alpha(i) panel.

In variations where the comparison in step 150 is greater than Epsilon, the method 10 proceeds to step 160 where the integer 'i' is incremented to 'i+1' (e.g., i=2) and then proceeds to step 170 where an updated model of an Alpha(i) forming die with at least one morphed die surface (e.g., an Alpha(2) forming die model) is created or generated as a function of the comparison in step 140. Then at step 180 the method 10 includes running an FEA simulation of forming the blank using the Alpha(i) forming die into an Alpha(i) panel with at least one morphed surface (e.g., an FEA simulation of forming an Alpha(2) panel using the Alpha(2) forming die model is executed as step 180). As used herein the term "morph" or "morphed" refers to changing from one geometry to a different geometry using iterative gradual FEA steps or simulations.

In some variations the blank formed into the most recent Alpha(i) panel includes the hanging apertures HA1, HA2 at the same location as determined in step 120. That is, the hanging apertures HA1, HA2 are maintained at the same locations on the blank throughout the method 10. In other variations, hanging apertures are determined for each Alpha (i) panel that is formed as described above with respect to step 120. In such variations the method proceeds back to step 120 (not shown).

In variations where the most recent Alpha(i) panel includes the hanging apertures HA1, HA2 at the same location as determined in step 120, the method 10 returns to step 130 where an FEA simulation of the latest Alpha(i) panel hanging from the hanging apertures HA1, HA2 is executed. The method 10 proceeds again to step 140 where the latest hanging Alpha(i) panel is compared to the reference panel, and then again to step 150 where the comparison executed at step 140 is determined to be less than or equal to the predefined tolerance Epsilon, or the comparison executed at step 140 is determined to be greater than the predefined tolerance Epsilon. This cycle, i.e., steps 130-140-150-160-170-180-130, continues until the comparison executed at step 140 is determined to be less than or equal to the predefined tolerance Epsilon at step 150, after which the method 10 stops at 190. In some variations the latest model of the Alpha(i) forming die is used for the manufacture of a forming die that forms actual (physical) parts (e.g., actual parts corresponding to part 110P).

It should be understood that while FIG. 3 shows or illustrates comparing the geometry of an entire Alpha(i) panel to an entire geometry of a reference panel, in some variations a method according to the teachings of the present disclosure includes comparing geometries of separate surfaces of an Alpha(i) panel to geometries of corresponding separate surfaces of a reference part. Stated differently, in some forms of the present disclosure the method includes simulations of a panel with a focus on one or more particular surfaces of the panel before continuing with additional simulations on one or more additional surfaces of the panel.

Figure 5A:
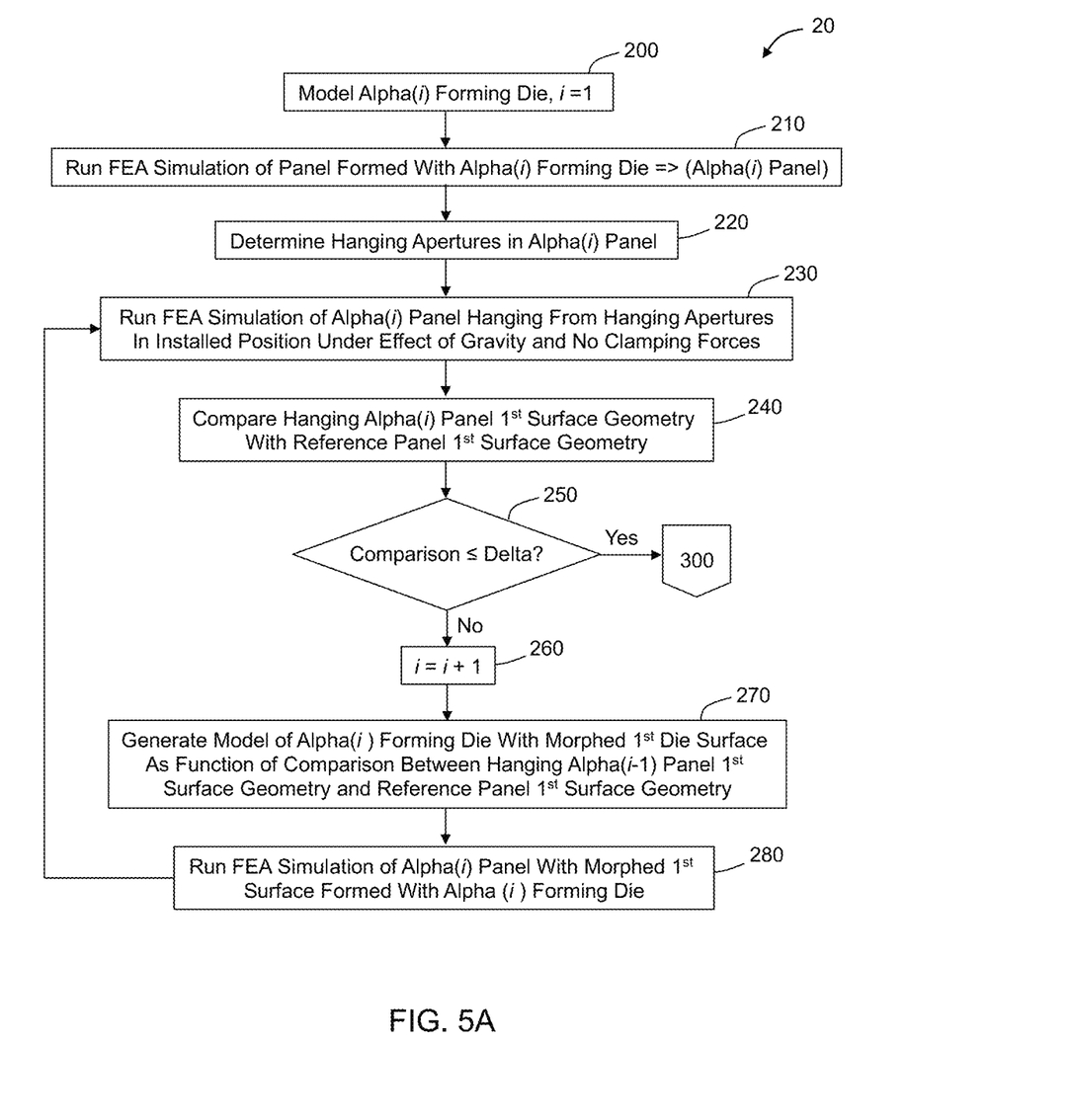
FIG. 5A is a flow chart for a method of evaluating and compensating springback of a first surface portion of a sheet metal part according to another form of the present disclosure.
Figure 5B:
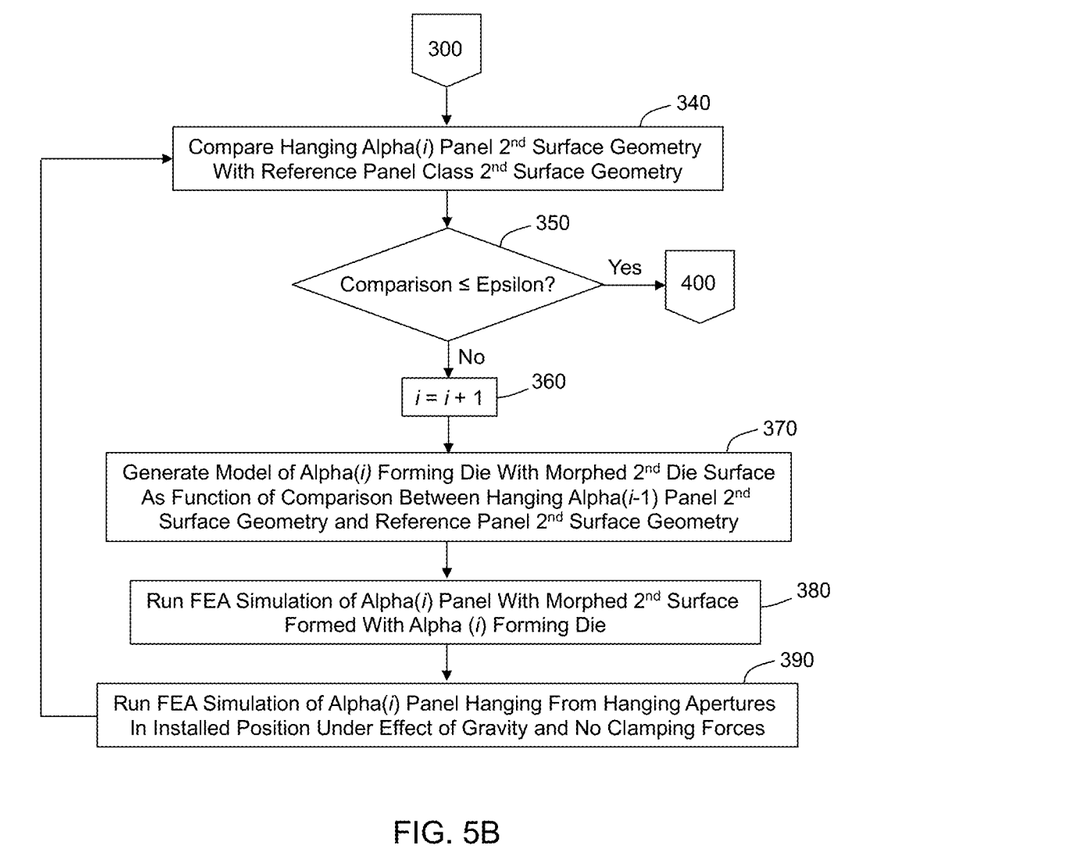
FIG. 5B is a flow chart for a method of evaluating and compensating springback of a second surface portion of the sheet metal part in FIG. 5A.
Figure 5C:
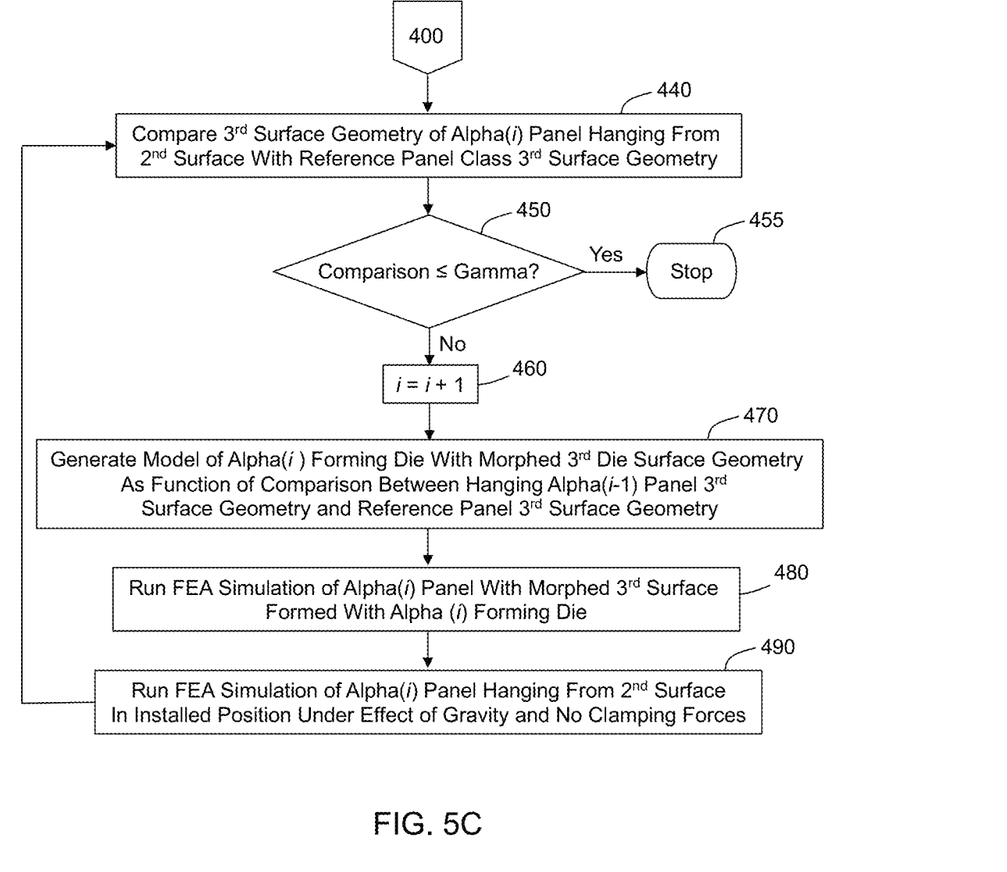
FIG. 5C is a flow chart for a method of evaluating and compensating springback of a third surface portion of the sheet metal part in FIG. 5A.

For example, and with reference to FIGS. 5A-5C, a method 20 includes simulations and comparisons of different surfaces of simulated hanging parts with corresponding different surfaces of a reference part. Particularly, and with reference to FIG. 5A, the method 20 includes starting with a model for an Alpha(i) forming die with i=1 at step 200. The method 20 then proceeds to step 210 where an FEA simulation of forming a blank using the Alpha(i) forming die model into an Alpha(i) panel is executed. For example, in some variations step 210 includes using a model of an Alpha(1) forming die to simulate the part 110P shown in FIG. 4A.

At step 220, the Alpha(i) panel is analyzed such that two or more zero springback locations on the Class A surface are determined and hanging apertures 'HA1' and 'HA2' are simulated to be present in or through the Class A surface at the two or more zero springback locations as shown in FIG. 4A. The method 20 proceeds to running an FEA simulation of the Alpha(i) panel hanging from the hanging apertures HA1, HA2 in an installed orientation and in a stress-free state except for the effect of gravity at step 230.

At step 240, the method 20 includes comparing a geometry of a first surface of the hanging Alpha(i) panel with a corresponding first surface of a reference panel. For example, in some variations the first surface is a Class A surface of the hanging Alpha(i) panel and a Class A surface of the reference part.

The method 20 proceeds to step 250 where a determination is made as to whether or not the comparison in step 240 is less than a predefined tolerance referred to herein as "Delta." Stated differently, step 250 determines whether or not the geometry of the first surface of the hanging Alpha(i) panel is within a predefined tolerance with respect to the first surface of the reference panel. In some variations the predefined tolerance Delta is +/−0.5 mm along a length direction (x direction), a width direction (y direction), and/or a height direction (z direction) of the Alpha(i) panel. In at least one variation the predefined tolerance Delta is +/−0.2 mm along a length direction (x direction), a width direction (y direction), and/or a height direction (z direction) of the Alpha(i) panel. And in still other variations the predefined tolerance Delta is +/−0.2 mm along a length direction (x direction), a width direction (y direction), and/or a height direction (z direction) of the Alpha(i) panel.

In some variations, the comparison in step 250 is not less than or equal to Delta and the method 20 proceeds to step 260 where the integer 'i' is incremented to 'i+1' (e.g., i=2) before proceeding to step 270 where an updated model of an Alpha(i) forming die with a morphed first die surface (e.g., an Alpha(2) forming die) is created or generated as a function of the comparison in step 240. Then at step 280 the method 20 includes running an FEA simulation of forming the blank using the Alpha(i) forming die model into an Alpha(i) panel with a morphed first surface (e.g., an FEA simulation of forming an Alpha(2) panel using the Alpha(2) forming die model is executed as step 280).

In some variations the blank formed into the most recent Alpha(i) panel includes the hanging apertures HA1, HA2 at the same location as determined in step 220. That is, the hanging apertures HA1, HA2 are maintained at the same locations on the blank throughout the method 20. In other variations, hanging apertures are determined for each Alpha(i) panel that is formed as described above with respect to step 220. In such variations the method proceeds back to step 220 (not shown).

In variations where the most recent Alpha(i) panel includes the hanging apertures HA1, HA2 at the same location as determined in step 220, the method 20 returns to step 230 where an FEA simulation of the latest formed Alpha(i) panel hanging from the hanging apertures HA1, HA2 is executed, then to step 240 where the first surface of the latest hanging Alpha(i) panel is compared to the first surface of the reference panel. The method 20 then proceeds to step 250 where the comparison executed at step 240 is determined to be less than or equal to the predefined tolerance Delta or to be greater than the predefined tolerance Delta. This cycle, i.e., steps 230-240-250-260-270-280-230, continues until the step 250 determines the comparison executed at step 240 is less than or equal to the predefined tolerance Delta, and then the method 20 proceeds to 300 (e.g., method 20 proceeds to a module 300) as described below. Also, it should be understood that the cycle of steps 230-240-250-260-270-280-230 simulates the Alpha(i) panel with i=1, 2, 3, . . . , with "springback consideration" of the first surface before proceeding with springback consideration of a second surface as described below. And as used herein the phrase "springback consideration" refers to running simulations, comparing geometries, and/or generating forming die models of an entire Alpha(i) panel (i=1, 2, 3, . . . ), but with simulations, comparisons of geometries, generating of forming die models, and/or morphed surfaces focused on a particular recited surface of the Alpha(i) panel. Accordingly, the method 20 considers and compensates springback of a first surface before considering of focusing on springback of a subsequent surface.

Referring now to FIG. 5B, and after step 250 in FIG. 5A determines the comparison executed at step 240 is less than or equal to the predefined tolerance Delta, the method 20 proceeds to step 340 where a geometry of a second surface of the most recent hanging Alpha(i) panel is compared with a corresponding second surface of the reference panel. For example, in some variations the second surface is a catwalk surface of the hanging Alpha(i) panel and a catwalk surface of the reference part.

The method 20 proceeds to step 350 where a determination is made as to whether or not the comparison in step 340 is less than a predefined tolerance referred to herein as "Epsilon" as described above. Stated differently, step 350 determines whether or not the geometry of the second surface of the hanging Alpha(i) panel is within a predefined tolerance with respect to the second surface of the reference panel. In some variations the comparison in step 350 is not less than or equal to Epsilon and the method 20 proceeds to step 360 where the integer 'i' is incremented to 'i+1' before proceeding to step 370 where an updated model of an Alpha(i) forming die with a morphed second die surface is created or generated as a function of the comparison in step 340. Then at step 380 the method 20 includes running an FEA simulation of forming the blank using the Alpha(i) forming die into an Alpha(i) panel with a morphed second surface, and at step 390 the method 20 includes running an FEA simulation of the latest Alpha(i) panel hanging from the hanging apertures HA1, HA2.

The method 20 then returns to step 340 where the second surface of the latest hanging Alpha(i) panel is compared to the second surface of the reference panel before proceeding to step 350 where the comparison executed at step 340 is determined to be less than or equal to the predefined tolerance Epsilon or to be greater than the predefined tolerance Epsilon. This cycle, i.e., steps 340-350-360-370-380-390-340, continues until the comparison executed at step 340 is determined to be less than or equal to the predefined tolerance Epsilon at step 350, and then the method 20 proceeds to 400 (e.g., method 20 proceeds to a module 400) as described below. Also, it should be understood that in some variations the cycle of steps 340-350-360-370-380-390-340 simulates the Alpha(i) panel with i=1, 2, 3, . . . , with springback consideration of the second surface after executing springback consideration of the first surface as described above and before proceeding with springback consideration of a third surface as described below.

Figure 4B:
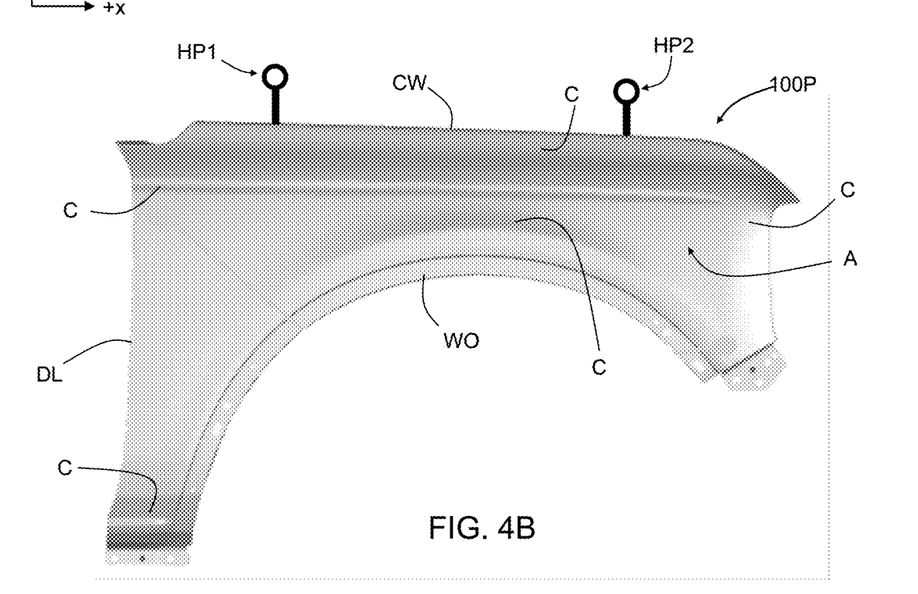
FIG. 4B is an image of a simulated sheet metal part hanging from a catwalk surface via a pair of hanging pins according to the teachings of the present disclosure.

Referring now to FIG. 5C, and after step 350 in FIG. 5B determines the comparison executed at step 340 is less than or equal to the predefined tolerance Epsilon, the method 20 proceeds to step 440 where a geometry of a third surface of the most recent Alpha(i) panel is compared with a corresponding third surface of the reference panel. However, and unlike steps 240, 340 where a geometry of a surface of the most recent Alpha(i) panel hanging from the hanging apertures HA1, HA2 is compared with a corresponding second surface of the reference panel, step 440 compares the geometry of the third surface of the most recent Alpha(i) panel hanging from the second surface, e.g., via at least one hanging pin HP1, HP2 as shown in FIG. 4B. For example, in some variations the third surface is a doorline surface DL or wheel opening surface WO of the hanging Alpha(i) panel and a corresponding doorline surface or wheel opening surface of the reference part and the hanging Alpha(i) panel is simulated as hanging from the catwalk surface CW. Accordingly, in some variations evaluating springback of a simulated vehicle fender includes hanging the simulated vehicle fender from zero springback locations until springback of a catwalk surface is determined to be less than or equal to a predefined tolerance, followed by hanging the simulated vehicle fender from the catwalk surface until springback of additional surfaces (e.g., doorline and/or wheel opening surfaces) is determined to be less than or equal to a predefined tolerance. It should be understood that the simulated vehicle fender from the catwalk surface more closely replicates the simulated vehicle fender and/or a corresponding physical vehicle fender during and/or after installation on a motor vehicle.

The method 20 proceeds to step 450 where a determination is made as to whether or not the comparison in step 440 is less than a predefined tolerance referred to herein as "Gamma." Stated differently, step 450 determines whether or not the geometry of the third surface of the hanging Alpha(i) panel is within a predefined tolerance with respect to the third surface of the reference panel. In some variations the predefined tolerance Gamma is +/−0.5 mm along a length direction (x direction), a width direction (y direction), and/or a height direction (z direction) of the Alpha(i) panel. In at least one variation the predefined tolerance Epsilon is +/−0.2 mm along a length direction (x direction), a width direction (y direction), and/or a height direction (z direction) of the Alpha(i) panel. And in still other variations the predefined tolerance Gamma is +/−0.2 mm along a length direction (x direction), a width direction (y direction), and/or a height direction (z direction) of the Alpha(i) panel.

In some variations, the comparison in step 450 is not less than or equal to Gamma and the method 20 proceeds to step 460 where the integer 'i' is incremented to 'i+1' before proceeding to step 470 where a model of an Alpha(i) forming die with a morphed third die surface is created or generated as a function of the comparison in step 440. Then at step 480 the method 20 includes running an FEA simulation of forming the blank using the most recent Alpha(i) forming die model into an Alpha(i) panel with a morphed third surface and at step 490 the method 20 includes running an FEA simulation of the latest formed Alpha(i) panel hanging from the second surface (e.g., a catwalk surface CW).

The method 20 then returns to step 440 where the third surface of the latest hanging Alpha(i) panel is compared to the third surface of the reference panel. The method 20 proceeds to step 450 where the comparison executed at step 440 is determined to be less than or equal to the predefined tolerance Gamma or to be greater than the predefined tolerance Gamma. This cycle, i.e., steps 440-450-460-470-480-490-440, continues until the step 450 determines the comparison executed at step 440 is less than or equal to the predefined tolerance Gamma, and then the method 20 stops at 455. Also, it should be understood that in some variations the cycle of steps 440-450-460-470-480-490-440 simulates the Alpha(i) panel with i=1, 2, 3, . . . , with springback consideration of the third surface after springback consideration of the first and second surfaces as described above.

In some variations the latest model of the Alpha(i) forming die is used for the manufacture of a forming die used to form actual or physical parts.

It should be understood that the present disclosure provides a method for springback compensation that uses FEA simulations to evaluate and compare springback of simulated formed panels with a simulated reference panel. The evaluation and comparison of the springback of the simulated formed panels with the simulated reference panel is used to create or generate a forming die model with at least one morphed surface, which is in turned used to simulate additional formed panels. The simulated additional formed panels are also evaluated and compared to the simulated reference panel and the process repeated until one or more simulated formed panels have a springback within a predefined tolerance when compared to the simulated reference panel. In some variations, the simulated formed panels are evaluated in an installed orientation and in a stress-free state. And in at least one variation the simulated formed panels are evaluated after being hung from hanging apertures positioned at zero feedback locations of the simulated formed panels until morphing of the forming die model results in a first surface and a second surface of the simulated formed panels having a springback less than or equal to a predefined tolerance, followed by evaluating a third surface of simulated formed panels being hung from the second surface.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for compensating springback of a part, the method comprising:
    a) running a finite element analysis (FEA) simulation of forming a panel using a model of an Alpha(i) forming die such that an Alpha(i) panel with springback is simulated, wherein i=1;
    b) determining at least two locations on the Alpha(i) panel and simulating an aperture at each of the at least two locations, wherein the simulated apertures in the Alpha (i) panel comprise hanging apertures;
    c) running an FEA simulation of the Alpha(i) panel hanging from the hanging apertures in an installed orientation and in a stress-free state except for an effect of gravity;
    d) comparing a geometry of the hanging Alpha(i) panel to a geometry of a reference panel and determining a difference between the geometry of the hanging Alpha (i) panel and the geometry of the reference panel due to the springback;
    e) incrementing i to equal i+1;
    f) generating the Alpha(i) forming die model with at least one morphed die surface as a function of the difference between the geometry of a hanging Alpha(i−1) panel and the geometry of the reference panel due to the springback;
    g) running an FEA simulation of forming the panel with the hanging apertures using the Alpha(i) forming die model such that the Alpha(i) panel with springback and at least one morphed surface is simulated; and
    h) repeating steps c) through g) until the difference between the geometry of the hanging Alpha(i) panel and the geometry of the reference panel due to the springback is less than a predefined delta value.

2. The method according to claim 1, wherein the Alpha(i) panel comprises a Class A surface and a non-Class A surface.

3. The method according to claim 2, wherein the at least two hanging apertures extend through the Class A surface of the Alpha(i) panel.

4. The method of according to claim 3, wherein step c) comprises running the FEA simulation of the Alpha(i) panel hanging from the apertures hanging in the installed orientation and in the stress-free stated except for the effect of gravity, wherein the Alpha(i) panel has a morphed non-Class A surface compared to the Alpha(i−1) panel.

5. The method according to claim 4, wherein step d) comprises comparing the Class A surface geometry of the hanging Alpha(i) panel to a Class A surface geometry of the reference panel and determining a difference between the Class A surface geometry of the hanging Alpha(i) panel and the Class A surface geometry of the reference panel.

6. The method according to claim 5, wherein step f) comprises generating the Alpha(i) forming die model with springback consideration of the Class A surface as a function of the difference between the Class A surface geometry of the hanging Alpha(i) panel geometry and the Class A surface geometry of the reference panel.

7. The method according to claim 6, wherein step h) comprises repeating steps c) through g) with springback consideration of the Class A surface until the difference between the Class A surface geometry of the hanging Alpha(i) panel and the Class A surface geometry of the reference panel due to the springback is less than the predefined delta value.

8. The method according to claim 7 further comprising:
    j) running an FEA simulation of the Alpha(i) panel hanging in the installed orientation and in the stress-free stated except for the effect of gravity, wherein the Alpha(i) panel is simulated hanging from the hanging apertures or from at least one hanging pin attached to the non-Class A surface;
    k) comparing the non-Class A surface geometry of the hanging Alpha(i) panel to a non-Class A surface geometry of the reference panel and determining a difference between the non-Class A surface geometry of the hanging Alpha(i) panel and the non-Class A surface geometry of the reference panel;
    l) incrementing i to equal i+1;
    m) generating the Alpha(i) forming die with springback consideration of the non-Class A surface as a function of the difference between the non-Class A surface geometry of the hanging Alpha(i) panel and the non-Class A surface geometry of the reference panel;
    n) running an FEA simulation of forming an Alpha(i) panel with the hanging apertures using the Alpha(i) forming die model and with springback consideration of the non-Class A surface; and
    o) repeating steps j) through n) until the difference between the non-Class A surface of the hanging Alpha (i) panel geometry and the non-Class A surface geometry of the reference panel due to the springback is less than a predefined epsilon value.

9. The method according to claim 1, wherein the panel is a fender panel of a vehicle, the fender panel comprising a Class A surface, a catwalk surface, a doorline surface, and a wheel opening surface.

10. The method according to claim 9, wherein the steps of claim 1 further comprise:
    a) running an FEA simulation of forming the fender panel using the Alpha(i) forming die model where i=1 such that an Alpha(i) fender panel is simulated;
    b) determining the at least two locations on the Class A Surface of the Alpha(i) fender panel and simulating the aperture at each of the at least two locations, wherein the simulated apertures in the Alpha(i) fender panel comprise the hanging apertures;
    c) running an FEA simulation of the Alpha(i) fender panel hanging from the hanging apertures in the installed orientation and in the stress-free stated except for the effect of gravity;

d) comparing the Class A surface geometry of the hanging Alpha(i) fender panel to a Class A surface geometry of the reference panel and determining a difference between the Class A surface geometry of the hanging Alpha(i) fender panel and the Class A surface geometry of the reference panel due to the springback;

e) incrementing i to equal i+1;

f) generating the Alpha(i) forming die model with springback consideration of the Class A surface as a function of the difference between the Class A surface geometry of the hanging Alpha(i−1) fender panel and the Class A surface geometry of the reference panel due to the springback;

g) running an FEA simulation of forming the panel with the hanging apertures using the Alpha(i) forming die model and with springback consideration of the Class A surface; and h) repeating steps c) through g) until the difference between the Class A surface geometry of the hanging Alpha(i) fender panel and the Class A surface geometry of the reference panel due to the springback is less than the predefined delta value.

11. The method according to claim 10 further comprising:

j) running the FEA simulation of the catwalk surface of the Alpha(i) fender panel hanging from the hanging apertures in the installed orientation and in the stress-free stated except for the effect of gravity;

k) comparing a catwalk surface geometry of the hanging Alpha(i) fender panel to a catwalk surface geometry of the reference panel and determining a difference between the catwalk surface geometry of the hanging Alpha(i) fender panel geometry and the catwalk surface geometry of the reference panel;

l) incrementing i to equal i+1;

m) generating the Alpha(i) forming die model with springback consideration of the catwalk surface as a function of the difference between the catwalk surface geometry of the hanging Alpha(i) fender panel and the catwalk surface geometry of the reference panel;

n) running an FEA simulation of forming the panel with the hanging apertures using the Alpha(i) forming die model and with springback consideration of the catwalk surface; and o) repeating steps j) through n) until the difference between the catwalk surface geometry of the hanging Alpha(i) fender panel and the catwalk surface geometry of the reference panel due to the springback is less than a predefined epsilon value.

12. The method according to claim 11 further comprising:

p) running an FEA simulation of the Alpha(i) fender panel hanging from the catwalk surface in the installed orientation and in the stress-free stated except for the effect of gravity;

q) comparing a doorline surface geometry of the hanging Alpha(i) fender panel to a doorline surface geometry of the reference panel and determining a difference between the doorline surface geometry of the hanging Alpha(i) fender panel geometry and the doorline surface geometry of the reference panel;

r) incrementing i to equal i+1;

s) generating the Alpha(i) forming die model with springback consideration of the doorline surface as a function of the difference between the doorline surface geometry of the hanging Alpha(i) fender panel and the doorline surface geometry of the reference panel;

t) running an FEA simulation of forming the panel with the hanging apertures using the Alpha(i) forming die model and with springback consideration of the doorline surface; and u) repeating steps p) through t) until the difference between the doorline surface geometry of the hanging Alpha(i) fender panel and the doorline surface geometry of the reference panel due to the springback is less than a predefined gamma value.

13. The method according to claim 12 further comprising:

v) running an FEA simulation of the Alpha(i) fender panel hanging from the catwalk surface in the installed orientation and in the stress-free stated except for the effect of gravity;

w) comparing a wheel opening surface geometry of the hanging Alpha(i) fender panel to a wheel opening surface geometry of the reference panel and determining a difference between the wheel opening surface geometry of the hanging Alpha(i) fender panel geometry and the wheel opening surface geometry of the reference panel;

x) incrementing i to equal i+1;

y) generating the Alpha(i) forming die model with springback consideration of the wheel opening surface as a function of the difference between the wheel opening surface geometry of the hanging Alpha(i) fender panel and the wheel opening surface geometry of the reference panel;

z) running an FEA simulation of forming the panel using the Alpha(i) forming die model and with springback consideration of the wheel opening surface; and aa) repeating steps v) through z) until the difference between the wheel opening surface geometry of the hanging Alpha(i) fender panel and the wheel opening surface geometry of the reference panel due to springback is less than a predefined gamma value.

14. The method according to claim 13 further comprising manufacturing at least one forming die based on the Alpha(i) forming die model.

15. A method for compensating springback of a fender for a vehicle, the method comprising:

a) running a finite element analysis (FEA) simulation of forming a panel using an Alpha(i) forming die model such that an Alpha(i) fender panel with springback is simulated, wherein i=1;

b) determining at least two locations on a Class A surface of the Alpha(i) fender panel and simulating an aperture at each of the at least two locations, wherein the simulated apertures in the Alpha(i) fender panel comprise hanging apertures;

c) running an FEA simulation of the Alpha(i) fender panel hanging from the hanging apertures in an installed orientation and in a stress-free stated except for an effect of gravity;

d) comparing a Class A surface geometry of the hanging Alpha(i) fender panel to a Class A surface geometry of a reference panel and determining a difference between the Class A surface geometry of the hanging Alpha(i) fender panel and the Class A surface geometry of the reference panel due to the springback;

e) incrementing i to equal i+1;

f) generating the Alpha(i) forming die model with springback consideration of the Class A surface as a function of the difference between the Class A surface geometry of the hanging Alpha(i) fender panel to the Class A surface geometry of the reference panel due to the springback;

g) running an FEA simulation of forming the panel with the hanging apertures using the Alpha(i) forming die model and with springback consideration of the Class A surface; and h) repeating steps c) through g) until the difference between the Class A surface geometry of the hanging Alpha(i) panel and the Class A surface geometry of the reference panel due to the springback is less than a predefined delta value.

16. The method according to claim 15 further comprising:

j) running an FEA simulation of the Alpha(i) fender panel hanging from the hanging apertures in the installed orientation and in the stress-free stated except for the effect of gravity;

k) comparing a catwalk surface geometry of the hanging Alpha(i) fender panel to a catwalk surface geometry of the reference panel and determining a difference between the catwalk surface geometry of the hanging Alpha(i) fender panel geometry and the catwalk surface geometry of the reference panel;

l) incrementing i to equal i+1;

m) generating the Alpha(i) forming die model with springback consideration of the catwalk surface as a function of the difference between the catwalk surface geometry of the hanging Alpha(i) fender panel and the catwalk surface geometry of the reference panel;

n) running an FEA simulation of forming the fender panel with the hanging apertures using the Alpha(i) forming die model and with springback consideration of the catwalk surface; and o) repeating steps j) through n) until the difference between the catwalk surface geometry of the hanging Alpha(i) fender panel and the catwalk surface geometry of the reference panel due to the springback is less than a predefined epsilon value.

17. The method according to claim 16 further comprising manufacturing at least one forming die based on the Alpha(i) forming die model.

18. The method according to claim 15, wherein the Alpha (i) panel comprises a Class A surface and a non-Class A surface, and wherein the at least two hanging apertures extend through the Class A surface of the Alpha (i) panel.

19. A method for compensating springback of a fender for a vehicle, the method comprising:

a) running a finite element analysis (FEA) simulation of forming a panel using an Alpha(i) forming die model such that an Alpha(i) fender panel with springback is simulated, wherein i=1;

b) determining at least two locations on a Class A surface of the Alpha(i) fender panel and simulating an aperture at each of the at least two locations, wherein the simulated apertures in the Alpha(i) fender panel comprise hanging apertures;

c) running an FEA simulation of the Alpha(i) fender panel hanging from the hanging apertures in an installed orientation and in a stress-free stated except for an effect of gravity;

d) comparing a Class A surface geometry of the hanging Alpha(i) fender panel to a Class A surface geometry of a reference panel and determining a difference between the Class A surface geometry of the hanging Alpha(i) fender panel to the Class A surface geometry of the reference panel due to the springback;

e) incrementing i to equal i+1;

f) generating the Alpha(i) forming die model with springback consideration of the Class A surface as a function of the difference between the Class A surface geometry of the hanging Alpha(i) fender panel to the Class A surface geometry of the reference panel due to the springback;

g) running an FEA simulation of forming the panel with the hanging apertures using the Alpha(i) forming die model and with springback consideration of the Class A surface;

h) repeating steps c) through g) until the difference between the Class A surface geometry of the hanging Alpha(i) panel and the Class A surface geometry of the reference panel due to the springback is less than a predefined delta value;

j) running an FEA simulation of the Alpha(i) fender panel hanging from the hanging apertures in the installed orientation and in the stress-free stated except for the effect of gravity;

k) comparing a catwalk surface geometry of the hanging Alpha(i) fender panel to a catwalk surface geometry of the reference panel and determining a difference between the catwalk surface geometry of the hanging Alpha(i) fender panel geometry and the catwalk surface geometry of the reference panel;

l) incrementing i to equal i+1;

m) generating the Alpha(i) forming die model with springback consideration of the catwalk surface as a function of the difference between the catwalk surface geometry of the hanging Alpha(i) fender panel and the catwalk surface geometry of the reference panel;

n) running an FEA simulation of forming the panel with the hanging apertures using the Alpha(i) forming die model and with springback consideration of the catwalk surface;

o) repeating steps j) through n) until the difference between the catwalk surface geometry of the hanging Alpha(i) fender panel and the catwalk surface geometry of the reference panel due to the springback is less than a predefined epsilon value;

p) running an FEA simulation of the Alpha(i) fender panel hanging from the catwalk surface in the installed orientation and in the stress-free stated except for the effect of gravity;

q) comparing a doorline surface geometry of the hanging Alpha(i) fender panel to a doorline surface geometry of the reference panel and determining a difference between the doorline surface geometry of the hanging Alpha(i) fender panel geometry and the doorline surface geometry of the reference panel;

r) incrementing i to equal i+1;

s) generating the Alpha(i) forming die model with springback consideration of the doorline surface as a function of the difference between the doorline surface geometry of the hanging Alpha(i) fender panel and the doorline surface geometry of the reference panel;

t) running an FEA simulation of forming the panel using the Alpha(i) forming die model and with springback consideration of the doorline surface;

u) repeating steps p) through t) until the difference between the doorline surface geometry of the hanging Alpha(i) fender panel and the doorline surface geometry of the reference panel due to the springback is less than a predefined gamma value;

v) running an FEA simulation of the Alpha(i) fender panel hanging from the catwalk surface in the installed orientation and in the stress-free stated except for the effect of gravity;

w) comparing a wheel opening surface geometry of the hanging Alpha(i) fender panel to a wheel opening surface geometry of the reference panel and determining a difference between the wheel opening surface geometry of the hanging Alpha(i) fender panel geometry and the wheel opening surface geometry of the reference panel;

x) incrementing i to equal i+1;

y) generating the Alpha(i) forming die model with springback consideration of the wheel opening surface as a function of the difference between the wheel opening surface geometry of the hanging Alpha(i) fender panel and the wheel opening surface geometry of the reference panel;

z) running an FEA simulation of forming the panel using the Alpha(i) forming die model and with springback consideration of the doorline surface; and aa) repeating steps v) through z) until the difference between the doorline surface geometry of the hanging Alpha(i) fender panel and the doorline surface geometry of the reference panel due to springback is less than a predefined gamma value.

20. The method according to claim 19 further comprising manufacturing at least one forming die based on the Alpha(i) forming die model.

\* \* \* \* \*